United States Patent
Shibutani

(10) Patent No.: US 12,341,180 B2
(45) Date of Patent: Jun. 24, 2025

(54) SECONDARY BATTERY WITH POSITIVE ELECTRODE ADDITIONAL LAYER INCLUDING INERT MATERIAL

(71) Applicant: Panasonic Intellectual Property Management Co., Ltd., Osaka (JP)

(72) Inventor: Satoshi Shibutani, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 592 days.

(21) Appl. No.: 17/637,537

(22) PCT Filed: Jun. 23, 2020

(86) PCT No.: PCT/JP2020/024532
§ 371 (c)(1),
(2) Date: Feb. 23, 2022

(87) PCT Pub. No.: WO2021/039063
PCT Pub. Date: Mar. 4, 2021

(65) Prior Publication Data
US 2022/0293896 A1 Sep. 15, 2022

(30) Foreign Application Priority Data
Aug. 27, 2019 (JP) .................. 2019-154693

(51) Int. Cl.
*H01M 4/04* (2006.01)
*H01M 4/36* (2006.01)
(Continued)

(52) U.S. Cl.
CPC ......... *H01M 4/0404* (2013.01); *H01M 4/366* (2013.01); *H01M 4/505* (2013.01);
(Continued)

(58) Field of Classification Search
CPC .... H01M 4/0404; H01M 4/366; H01M 4/505; H01M 4/525
See application file for complete search history.

(56) References Cited

U.S. PATENT DOCUMENTS

| | | | |
|---|---|---|---|
| 5,817,436 A | 10/1998 | Nishijima et al. | |
| 2004/0126660 A1* | 7/2004 | Ohzuku | H01M 4/525 |
| | | | 429/231.95 |

(Continued)

FOREIGN PATENT DOCUMENTS

| | | | | |
|---|---|---|---|---|
| CN | 104937748 A | * | 9/2015 | ............. C08G 65/14 |
| JP | 9-241027 A | | 9/1997 | |

(Continued)

OTHER PUBLICATIONS

CN 104937748 English Translation (Year: 2015).*

(Continued)

*Primary Examiner* — Jimmy Vo
(74) *Attorney, Agent, or Firm* — WHDA, LLP

(57) ABSTRACT

This secondary battery comprises a positive electrode, a negative electrode, a separator positioned between the positive electrode and the negative electrode, and an electrolyte. The positive electrode has a positive electrode current collector, a positive electrode mixture layer containing a positive electrode active material, and an additional layer containing an inactive material. The inactive material is an Li-containing transition metal oxide having a crystal structure belonging to one space group from among Fm3m, C2/M, Immm, and P3m1. The inactive material content of the additional layer is 60 mass % or greater, and the basis weight of the additional layer is 3.8 g/m$^2$ to 50 g/m$^2$ (inclusive).

4 Claims, 2 Drawing Sheets

(51) Int. Cl.
 *H01M 4/505* (2010.01)
 *H01M 4/525* (2010.01)
 *H01M 4/02* (2006.01)

(52) U.S. Cl.
 CPC ...... *H01M 4/525* (2013.01); *H01M 2004/021* (2013.01); *H01M 2004/028* (2013.01)

(56) References Cited

U.S. PATENT DOCUMENTS

| | | |
|---|---|---|
| 2012/0021284 A1 | 1/2012 | Lee et al. |
| 2012/0088152 A1* | 4/2012 | Kobori ................ H01M 4/0404 429/211 |
| 2014/0154586 A1 | 6/2014 | Hayashi et al. |
| 2015/0064558 A1 | 3/2015 | Seki et al. |
| 2016/0190566 A1 | 6/2016 | Shiozaki et al. |
| 2018/0277841 A1* | 9/2018 | Harada ................ H01M 4/131 |

FOREIGN PATENT DOCUMENTS

| | | |
|---|---|---|
| JP | 2007-242420 A | 9/2007 |
| JP | 2010-282849 A | 12/2010 |
| JP | 2012-28322 A | 2/2012 |
| JP | 2014-110149 A | 6/2014 |
| JP | 2015-138730 A | 7/2015 |
| JP | 2016-127000 A | 7/2016 |
| WO | 2013/146723 A1 | 10/2013 |

OTHER PUBLICATIONS

International Search Report dated Aug. 18, 2020, issued in counterpart International Application No. PCT/JP2020/024532 (3 pages).

* cited by examiner

SECONDARY BATTERY WITH POSITIVE ELECTRODE ADDITIONAL LAYER INCLUDING INERT MATERIAL

TECHNICAL FIELD

The present invention relates to the art of a secondary battery.

BACKGROUND ART

As an example of secondary batteries, widely used is a non-aqueous electrolyte secondary battery comprising a positive electrode, a negative electrode, and an electrolyte, in which lithium ions transfer between the positive electrode and the negative electrode to perform charge and discharge.

Patent Literature 1, for example, discloses a positive electrode for a non-aqueous electrolyte secondary battery, the positive electrode comprising: a positive electrode current collector; a protecting layer formed on the positive electrode current collector; and a positive electrode mixture layer including a lithium-containing transition metal oxide and formed on the protecting layer, wherein the protecting layer has a thickness of 1 μm to 5 μm and includes an inorganic compound having a lower oxidizability than the lithium-containing transition metal oxide and a conductive agent.

Patent Literature 2, for example, discloses a secondary battery comprising a positive electrode and a negative electrode, wherein the positive electrode comprises a positive electrode current collector and a positive electrode mixture layer supported on the positive electrode current collector; the positive electrode mixture layer has a first positive electrode mixture layer formed on the positive electrode current collector and a second positive electrode mixture layer covering the first positive electrode mixture layer; the first positive electrode mixture layer includes a first positive electrode active material being able to deintercalate oxygen during an overcharge; and the second positive electrode mixture layer includes a second positive electrode active material having a higher moisture resistance than the first positive electrode active material.

CITATION LIST

Patent Literature

PATENT LITERATURE 1: JP 2016-127000 A
PATENT LITERATURE 2: JP 2015-138730 A

SUMMARY

When an internal short circuit occurs due to piercing with a foreign matter (for example, a metal object such as a nail), the secondary batteries may generate heat, leading to raised temperature.

An object of the present disclosure is to provide a secondary battery that can prevent a rise in battery temperature when an internal short circuit occurs due to piercing with a foreign matter.

A secondary battery of an aspect of the present disclosure comprises: a positive electrode; a negative electrode; a separator disposed between the positive electrode and the negative electrode; and an electrolyte, wherein the positive electrode has a positive electrode current collector, a positive electrode mixture layer including a positive electrode active material, and an additional layer including an inert material; the inert material is a Li-containing transition metal oxide having a crystal structure belonging to any of space groups Fm3m, C2/M, Immm, and P3m1; the content of the inert material in the additional layer is 60 mass % or more; and the basis weight of the additional layer is 3.8 g/m² or more and 50 g/m² or less.

According to an aspect of the present disclosure, a rise in battery temperature when an internal short circuit occurs due to piercing with a foreign matter can be prevented.

DESCRIPTION OF EMBODIMENTS

A secondary battery of an aspect of the present disclosure comprises: a positive electrode; a negative electrode; a separator disposed between the positive electrode and the negative electrode; and an electrolyte, wherein the positive electrode has a positive electrode current collector, a positive electrode mixture layer including a positive electrode active material, and an additional layer including an inert material; the inert material is a Li-containing transition metal oxide having a crystal structure belonging to any of space groups Fm3m, C2/M, Immm, and P3m1; the content of the inert material in the additional layer is 60 mass % or more; and the basis weight of the additional layer is 3.8 g/m² or more and 50 g/m² or less. The secondary battery of an aspect of the present disclosure can prevent a rise in battery temperature when an internal short circuit occurs due to piercing with a foreign matter.

The Li-containing transition metal oxide having a crystal structure belonging to any of space groups Fm3m, C2/M, Immm, and P3m1 is a material that is difficult to reversibly intercalate and deintercalate a chemical species to be a charge carrier, such as a lithium ion, and which is so-called an electrochemically inert material. Providing the additional layer including 60 mass % or more of such an inert material and having a basis weight of 3.8 g/m² or more and 50 g/m² or less in the positive electrode allows the additional layer to be a resistant component when an internal short circuit occurs due to piercing with a foreign matter (for example, a metal object such as a nail), and a current between the positive electrode and the negative electrode through the foreign matter may be reduced. As a result, a rise in battery temperature may be prevented when the internal short circuit occurs due to piercing with the foreign matter.

In the present disclosure, the secondary battery is an electrical storage apparatus that can be repeatedly charged and discharged, and is, for example, a non-aqueous electrolyte secondary battery and an aqueous secondary battery. Specific examples thereof include a lithium ion secondary batten and an alkali secondary battery. Hereinafter, the lithium ion secondary battery will be described as an example of the secondary battery of an aspect of the present disclosure.

Figure 1:
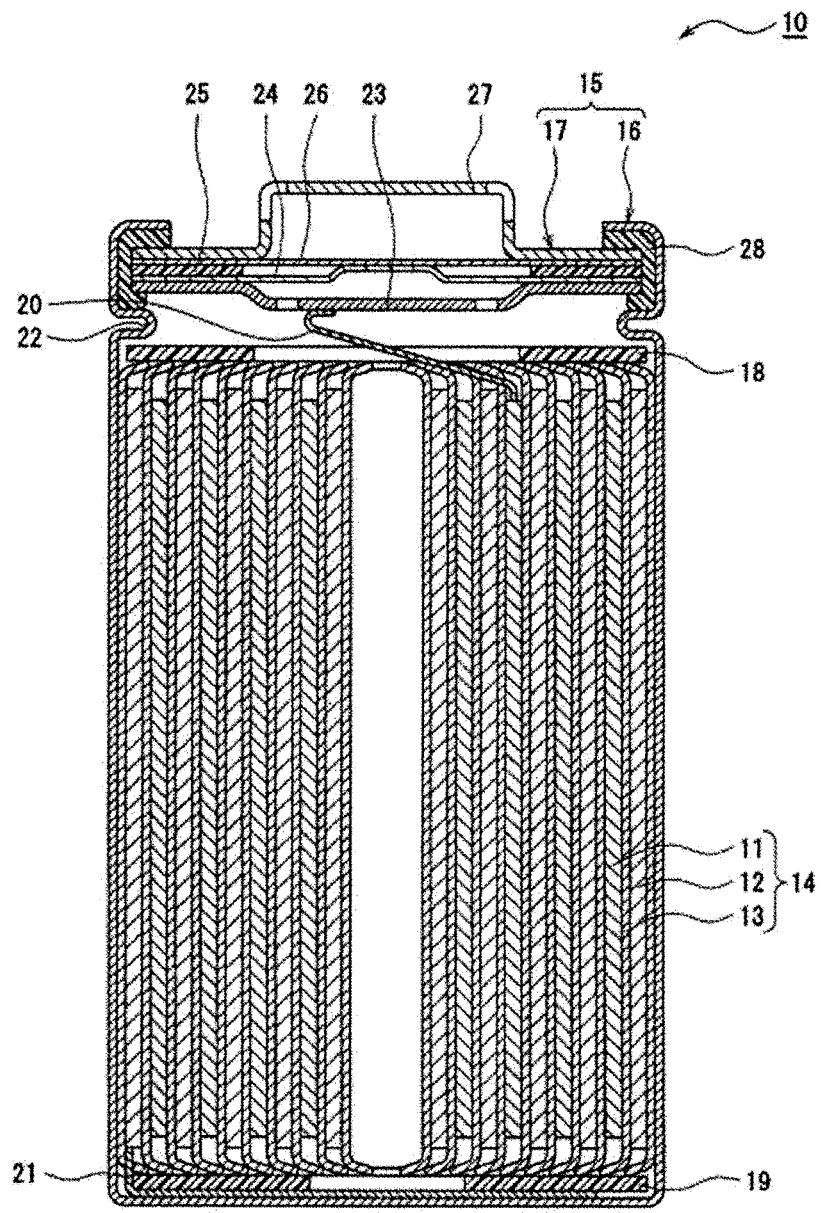
FIG. 1 is a cross sectional view of a lithium ion secondary battery of an example of an embodiment.

FIG. 1 is a cross sectional view of the lithium ion secondary battery of an example of an embodiment. A lithium ion secondary battery 10 illustrated in FIG. 1 comprises: a wound electrode assembly 14 in which a positive electrode 11 and a negative electrode 12 are wound with a separator 13 disposed therebetween; an electrolyte; insulating plates 18 and 19 disposed on the upper and lower sides of the electrode assembly 14, respectively; and a battery case 15 housing the above members. The battery case 15 is composed of a bottomed cylindrical case body 16 and a sealing assembly 17 sealing an opening of the case body 16. Instead of the wound electrode assembly 14, another form of electrode assembly may be employed, such as a stacked electrode assembly in which positive electrodes and negative electrodes are alternately stacked with separators disposed therebetween. Examples of the battery case 15 may include a metal case with a shape of cylinder, rectangular, coin, button, or the like, and a resin case formed by laminating resin sheets (laminated battery).

The case body 16 is, for example, a bottomed cylindrical metallic container. A gasket 28 is provided between the case body 16 and the sealing assembly 17 to achieve sealability inside the battery. The case body 16 has, for example, a projecting portion 22 in which a part of a side face projects inward for supporting the sealing assembly 17. The projecting portion 22 is preferably formed circularly along the circumferential direction of the case body 16, and supports the sealing assembly 17 with the upper face of the projecting portion 22.

The sealing assembly 17 has a stacked structure of a filter 23, a lower vent member 24, an insulating member 25, an upper vent member 26, and a cap 27 in this order from the electrode assembly 14 side. Each member constituting the sealing assembly 17 has, for example, a disk shape or a ring shape, and each member except for the insulating member 25 is electrically connected each other. The lower vent member 24 and the upper vent member 26 are connected at each of central parts thereof, and the insulating member 25 is disposed between each of the circumferential parts of the vent members 24 and 26. If the internal pressure of the lithium ion secondary battery 10 increases with abnormal heat generation due to an internal short circuit or the like, for example, the lower vent member 24 is deformed so as to push the upper vent member 26 up toward the cap 27 side and breaks, and thereby a current pathway between the lower vent member 24 and the upper vent member 26 is cut off. If the internal pressure further increases, the upper vent member 26 breaks, and gas is discharged through the cap 27 opening.

In the lithium ion secondary battery 10 illustrated in FIG. 1, a positive electrode lead 20 attached to the positive electrode 11 extends through a through hole in the insulating plate 18 toward a side of the sealing assembly 17, and a negative electrode lead 21 attached to the negative electrode 12 extends through an outside of the insulating plate 19 toward the bottom side of the case body 16. The positive electrode lead 20 is connected to a lower surface of a filter 23 being a bottom plate of the sealing assembly 17 by welding or the like, and the cap 27, which is a top plate of the sealing assembly 17 electrically connected to the filter 23, becomes a positive electrode terminal. The negative electrode lead 21 is connected to a bottom inner surface of the case body 16 by welding or the like, and the case body 16 becomes a negative electrode terminal.

Hereinafter, the positive electrode 11, the negative electrode 12, a non-aqueous electrolyte, and the separator 13 will be described in detail.

<Positive Electrode>

Figure 2:
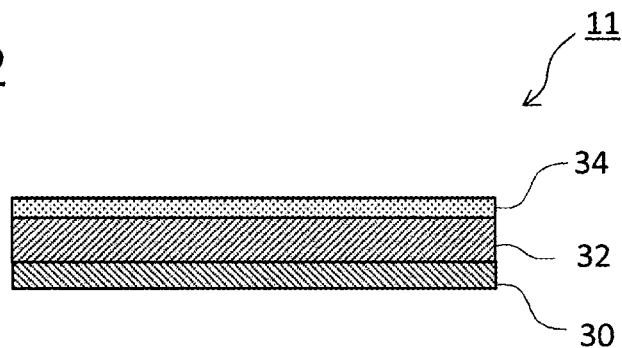
FIG. 2 is a cross sectional view illustrating an example of a positive electrode used for the secondary battery of the present embodiment.
Figure 3:
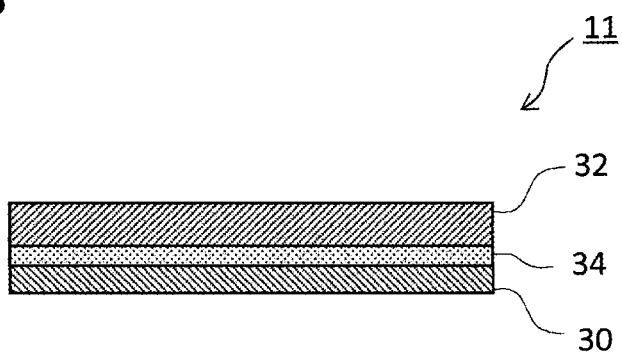
FIG. 3 is a cross sectional view illustrating another example of the positive electrode used for the secondary battery of the present embodiment.
Figure 4:
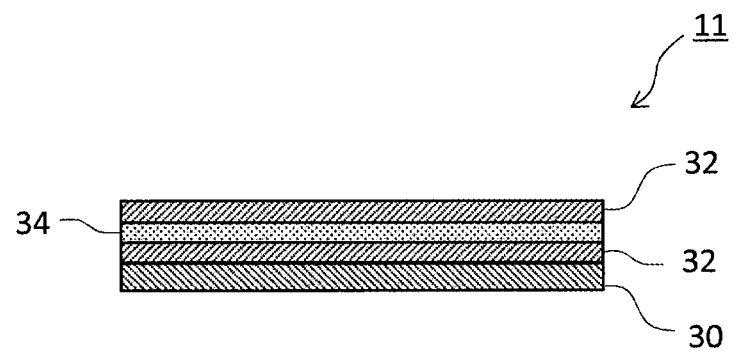
FIG. 4 is a cross sectional view illustrating another example of the positive electrode used for the secondary battery of the present embodiment.

FIG. 2 is a cross sectional view illustrating an example of the positive electrode used for the secondary battery of the present embodiment. The positive electrode 11 illustrated in FIG. 2 comprises a positive electrode current collector 30, a positive electrode mixture layer 32 disposed on the positive electrode current collector 30, and an additional layer 34 disposed on the positive electrode mixture layer 32. On the additional layer 34 is disposed a separator (not illustrated). That is, in the positive electrode 11 illustrated in FIG. 2, the additional layer 34 is located between the positive electrode mixture layer 32 and the separator. The location of the additional layer 34 is not limited, and as illustrated in FIG. 3, the additional layer 34 may be disposed, for example, on the positive electrode current collector 30 and the positive electrode mixture layer 32 may be disposed on the additional layer 34. That is, the additional layer 34 may be located between the positive electrode current collector 30 and the positive electrode mixture layer 32. Furthermore, as illustrated in FIG. 4, the additional layer 34 may be located, for example, between the positive electrode mixture layer 32 disposed on the positive electrode current collector 30 side and the positive electrode mixture layer 32 disposed on the separator side. The additional layer 34 and the positive electrode mixture layer 32 may be provided on only one surface of the positive electrode current collector 30, or may be provided on both surfaces of the positive electrode current collector 30.

For the positive electrode current collector 30, a foil of a metal stable within a potential range of the positive electrode, such as aluminum, a film in which such a metal is disposed on a surface layer thereof, and the like may be used. The thickness of the positive electrode current collector 30 is preferably, for example, within a range of 1 μm or more and 20 μm or less.

The positive electrode mixture layer 32 includes a positive electrode active material, and preferably further includes a binder, a conductive agent, and the like. The thickness of the positive electrode mixture layer 32 is preferably, for example, within a range of 20 μm or more and 100 μm or less.

The positive electrode active material is a material that may reversibly intercalate and deintercalate a chemical species to be a charge carrier, such as a lithium ion, and examples thereof include a lithium-transition metal oxide having a crystal structure belonging to the space group R-3m (the crystal structure of the space group R-3m is a layered structure). Examples of a metal element constituting the lithium-containing transition metal oxide used for the positive electrode active material include at least one selected from the group consisting of cobalt (Co), nickel (Ni), manganese (Mn), magnesium (Mg), aluminum (Al), calcium (Ca), scandium (Sc), titanium (Ti), vanadium (V), chromium (Cr), iron (Fe), copper (Cu), zinc (Zn), gallium (Ga), germanium (Ge), yttrium (Y), zirconium (Zr), tin (Sn), antimony (Sb), tungsten (W), lead (Pb), and bismuth (Bi). Among them, at least one selected from the group consisting of Co, Ni, Mn, and Al is preferably included.

The crystal structure of the positive electrode active material is identified with peaks observed in a diffraction pattern obtained with X-ray diffraction (XRD) measurement.

The X-ray diffraction pattern is obtained with the powder X-ray diffraction method using a powder X-ray diffraction apparatus (manufactured by Rigaku Corporation, product name "RINT-TTR", radiation source Cu-Kα) and with the following conditions.

Measuring Range; 15-120°
Scanning Rate; 4°/min
Analyzing Range; 30-120°
Background; B-spline
Profile Function; Split pseudo-Voigt function
Restricting Condition;

Li(3a)+Ni(3a)=1

Ni(3a)+Ni(3b)=y

ICSD No.; 98-009-4814

Examples of the conductive agent included in the positive electrode mixture layer 32 include carbon powders such as carbon black, acetylene black, Ketjenblack, and graphite. These materials may be used singly, or may be used in combination of two or more.

For the binder included in the positive electrode mixture layer 32, a fluororesin such as polytetrafluoroethylene (PTFE) and polyvinylidene fluoride (PVdF), PAN, a polyimide resin, an acrylic resin, a polyolefin resin, and the like may be used, for example. These materials may be used singly, or may be used in combination of two or more.

The additional layer 34 includes an inert material, and preferably further includes a conductive agent, a binder, and the like. The thickness of the additional layer 34 is preferably, for example, within a range of 1 μm or more and 5 μm or less. A conductive agent similar to the conductive agent used in the positive electrode mixture layer 32 may be used. A binder similar to the binder used in the positive electrode mixture layer 32 may be used.

The inert material is a Li-containing transition metal oxide having a crystal structure belonging to any of the space groups Fm3m, C2/M, Immm, and P3m1. The Li-containing transition metal oxide is a material that is difficult to reversibly intercalate and deintercalate a chemical species to be a charge carrier, such as a lithium ion, and is preferably a material that cannot reversibly intercalate and deintercalate lithium ions within a potential range of 2.5 V to 4.2 V (vs. Li/Li$^+$). The crystal structure of the inert material is identified with peaks observed in a diffraction pattern obtained with X-ray diffraction (XRD) measurement. Conditions of the XRD measurement are as above.

In terms of allowing the additional layer 34 to sufficiently function as a resistant component with an internal short circuit, the inert material preferably includes at least one of the group consisting of: a Li-containing transition metal oxide containing Fe or Mn as a main component of a transition metal and having a crystal structure belonging to the space group Fm3m; and a Li-containing transition metal oxide containing Cu or Ni as a main component of a transition metal and having a crystal structure belonging to any of the space groups C2/M, Immm, and P3m1. Here, the main component of the transition metal means a transition metal contained in the Li-containing transition metal oxide at the largest amount.

In particular, the inert material preferably includes at least one of the group consisting of: a Li-containing transition metal oxide represented by $Li_xFe_yM_{1-y}O_2$ (0.5≤x≤1.5, 0.5≤y≤1, and M represents a transition metal other than Fe) and belonging to the space group Fm3m; a Li-containing transition metal oxide represented by $Li_xMn_yM_{1-y}O_2$ (0.5≤x≤1.5, 0.5≤y≤1, and M represents a transition metal other than Mn) and belonging to the space group Fm3m; a Li-containing transition metal oxide represented by $Li_xCu_yM_{1-y}O_2$ (0.5≤x≤1.5, 0.5≤y≤1, and M represents a transition metal other than Cu) and having a crystal structure belonging to any of the space groups C2/M, Immm, and P3m1; and a Li-containing transition metal oxide represented by $Li_xNi_yM_{1-y}O_2$ (0.5≤x≤1.5, 0.5≤y≤1, and M represents a transition metal other than Ni) and having a crystal structure belonging to any of the space groups C2/M, Immm, and P3m1.

The content of the inert material in the additional layer 34 is 60 mass % or more, and preferably 90 mass % or more. When the content of the inert material in the additional layer 34 is less than 50 mass %, the additional layer 34 does not sufficiently function as a resistant component when an internal short circuit occurs due to piercing with a foreign matter, and a rise in battery temperature when the internal short circuit occurs cannot be sufficiently prevented. An upper limit of the content of the inert material in the additional layer 34 is not limited. The additional layer 34 may include the positive electrode active material. The content of the positive electrode active material in the additional layer 34 is not particularly limited as long as the effect of the present disclosure, which is prevention of a rise in battery temperature when the internal short circuit occurs, is not impaired, and for example, preferably 30 mass % or less, and more preferably 5 mass % or less. The positive electrode mixture layer 32 may include the inert material. The content of the inert material in the positive electrode mixture layer 32 is preferably an amount not lowering the battery capacity, and for example, preferably 2 mass % or less and more preferably 1 mass % or less.

The basis weight of the additional layer 34 is 3.8 g/m$^2$ or more and 50 g/m$^2$ or less, and preferably 7 g/m$^2$ or more and preferably 20 g/m$^2$ or less. When the basis weight of the additional layer 34 is less than 3.8 g/m$^2$, the additional layer 34 does not sufficiently function as a resistant component when an internal short circuit occurs due to piercing with a foreign matter, and a rise in battery temperature when the internal short circuit occurs cannot be sufficiently prevented. When the basis weight of the additional layer 34 is more than 50 g/m$^2$, an electric resistance of the positive electrode 11 increases, and the usual battery capacity is lowered.

On a location of the additional layer 34 in the positive electrode 11, among the locations illustrated in FIGS. 2 to 4, the additional layer 34 is preferably located between the positive electrode mixture layer 32 and the separator (FIG. 2). With the location of the additional layer 34 illustrated in FIG. 2, the additional layer 34 does not inhibit the current collection between the positive electrode current collector 30 and the positive electrode mixture layer 32, and thereby the lowering of the battery capacity is prevented.

When the additional layer 34 is located between the positive electrode mixture layer 32 and the separator, the void ratio of the additional layer 34 is preferably 25% or more and 55% or less, and more preferably 30% or more and 50% or less. With a void ratio of the additional layer 34 of less than 25%, the electrolyte is difficult to permeate into the positive electrode mixture layer 32, and the battery capacity is sometimes lowered. With a void ratio of the additional layer 34 of more than 55%, the rise in battery temperature when the internal short circuit occurs cannot be prevented in some cases, comparing with a void ratio of the additional layer 34 of 55% or less. When the additional layer 34 is located between the positive electrode current collector 30 and the positive electrode mixture layer 32 (FIG. 3) and when the additional layer 34 is sandwiched between positive electrode mixture layers 32 (FIG. 4), the void ratio of the additional layer 34 is preferably, for example, 70% or more and 87% or less, in terms of prevention of lowering the battery capacity and prevention of the rise in battery temperature when the internal short circuit occurs.

The void ratio of the additional layer 34 is calculated with the following formula.

Void Ratio of Additional Layer 34(%)=100−[[$W/(d \times \rho)$]×100]

W: Basis Weight of Additional Layer (g/cm$^2$)
d: Thickness of Additional Layer (cm)
ρ: Average Density of Additional Layer (g/cm$^3$)

Examples of a particle shape of the inert material include spherical, polyhedral, acicular, and necking. When the additional layer 34 is located between the positive electrode mixture layer 32 and the separator, the particle shape of the inert material is preferably polyhedral, acicular, or necking in terms of easy permeation of the electrolyte into the positive electrode mixture layer 32, improvement in the battery capacity, and the like.

The particle diameter of the inert material is preferably, for example, 5 μm or smaller, and more preferably 1.5 μm or smaller, in terms of more effective prevention of the rise in battery temperature when the internal short circuit occurs. The particle diameter means a 50% particle diameter (D50) at which a cumulation % on particle diameters is 50% in a particle size distribution measured with laser diffraction/scattering method.

The additional layer 34 including the inert material may be obtained by, for example, forming the additional layer 34 by deintercalating Li ions in the initial charge and by using a precursor to be the inert material, and charging and discharging a secondary battery comprising the additional layer 34 to change the precursor into the inert material. Examples of the precursor to be changed into the inert material by charging include $Li_5FeO_4$, $Li_6MnO_4$, $Li_2CuO_2$, $Li_2NiO_2$, and $Li_2Cu_{0.6}Ni_{0.4}O_2$.

<Negative Electrode>

The negative electrode 12 comprises: a negative electrode current collector such as, for example, a metal foil; and a negative electrode mixture layer formed on the negative electrode current collector. For the negative electrode current collector, a foil of a metal stable within a potential range of the negative electrode, such as copper, a film in which such a metal is disposed on a surface layer thereof, and the like may be used. The negative electrode mixture layer includes, for example, a negative electrode active material, and a binder.

The negative electrode active material included in the negative electrode mixture layer is not particularly limited, as long as the material is capable of intercalating and deintercalating lithium ions. Examples thereof include a carbon material, a metal capable of forming an alloy with lithium, and an alloy compound including the metal. For the carbon material, graphite such as natural graphite, hardly graphitizable carbon, and artificial graphite, and cokes may be used. Examples of the alloy compound include one including at least one metal capable of forming an alloy with lithium. An element capable of forming an alloy with lithium is preferably silicon or tin, and ones bonded to oxygen, such as silicon oxide and tin oxide, may also be used. A material in which the above carbon material and a compound of silicon or tin are mixed may be used. In addition to the above, a material having a charge-discharge potential against lithium metal higher than that of the carbon material or the like, such as lithium titanate, may also be used.

For the binder included in the negative electrode mixture layer, a fluororesin, PAN, a polyimide resin, an acrylic resin, a polyolefin resin, and the like may be used as in the case of the positive electrode. In addition, styrene-butadiene rubber (SBR), CMC or a salt thereof, polyacrylic acid (PAA) or salt thereof (which may be PAA-Na, PAA-K, and a partially neutralized salt), polyvinyl alcohol (PVA), and the like may be used.

<Electrolyte>

The electrolyte includes, for example, a non-aqueous solvent and an electrolyte salt dissolved in the non-aqueous solvent. The electrolyte is not limited to a liquid electrolyte, and may be a solid electrolyte using a gel polymer or the like. For the non-aqueous solvent, esters, ethers, nitriles such as acetonitrile, amides such as dimethylformamide, a mixed solvent of two or more thereof, and the like may be used, for example. The non-aqueous solvent may contain a halogen-substituted solvent in which at least some hydrogens in these solvents are substituted with halogen atoms such as fluorine.

Examples of the esters include: cyclic carbonates such as ethylene carbonate (EC), propylene carbonate (PC), and butylene carbonate; chain carbonates such as dimethyl carbonate (DMC), ethyl methyl carbonate (EMC), diethyl carbonate (DEC), methyl propyl carbonate, ethyl propyl carbonate, and methyl isopropyl carbonate; cyclic carboxylates such as γ-butyrolactone (GBL) and γ-valerolactone (GVL); and chain carboxylates such as methyl acetate, ethyl acetate, propyl acetate, methyl propionate (MP), and ethyl propionate.

Examples of the ethers include: cyclic ethers such as 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineole, and a crown ether; and chain ethers such as 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, and tetraethylene glycol dimethyl ether.

For the halogen-substituted solvent, fluorinated cyclic carbonates such as fluoroethylene carbonate (FEC), fluorinated chain carbonates, and fluorinated chain carboxylates such as methyl fluoropropionate (FMP) are preferably used.

The electrolyte salt is preferably a lithium salt. Examples of the lithium salt include $LiBF_4$, $LiClO_4$, $LiPF_6$, $LiAsF_6$, $LiSbF_6$, $LiAlCl_4$, LiSCN, $LiCF_3SO_3$, $LiCF_3CO_2$, $Li(P(C_2O_4)F_4)$, $LiPF_{6-x}(C_nF_{2n+1})_x$ (1<x<6, and n represents 1 or 2), $LiB_{10}Cl_{10}$, LiCl, LiBr, LiI, lithium chloroborane, a lithium lower aliphatic carboxylate, borate salts such as $Li_2B_4O_7$ and $Li(B(C_2O_4)F_2)$, and imide salts such as $LiN(SO_2CF_3)_2$ and $LiN(C_lF_{2l+1}SO_2)(C_mF_{2m+1}SO_2)$ {l and m represent integers of 0 or more}. As the lithium salt, one of them may be used singly, or types of the salts may be mixed to use. Among them, $LiPF_6$ is preferably used from the viewpoints of ion conductivity, electrochemical stability, and the like. The concentration of the lithium salt is preferably 0.8 to 1.8 mol per 1 L of the non-aqueous solvent.

<Separator>

For the separator 13, a porous sheet having an ion permeation property and an insulation property is used, for example. Specific examples of the porous sheet include a fine porous thin film, a woven fabric, and a nonwoven fabric. As a material for the separator 13, an olefin resin such as polyethylene and polypropylene, cellulose and the like are preferable. The separator 13 may be a stacked body having a cellulose fiber layer and a thermoplastic resin fiber layer such as an olefin resin, and the separator 13 with an aramid resin or the like applied on a surface thereof may also be used.

EXAMPLES

Hereinafter, the present invention will be further described with Examples, but the present invention is not limited to these Examples.

Example 1

[Production of Positive Electrode Active Material]

Mixing 98 parts by mass of a positive electrode active material (composition: $LiNi_{0.88}Co_{0.09}Al_{0.03}O_2$), 1 part by mass of acetylene black as the conductive agent, and 1 part by mass of polyvinylidene fluoride as the binder was performed at this ratio to prepare a slurry for the positive electrode mixture layer. Separately, mixing 99 parts by mass of $Li_5FeO_4$ (average particle diameter: 1 μm) as the precursor, 0.5 parts by mass of acetylene black, and 0.5 parts by mass of polyvinylidene fluoride was performed at this ratio to prepare a slurry for the additional layer. Then, the slurry for the positive electrode mixture layer was applied on an aluminum foil having a thickness of 15 μm, the slurry for the additional layer was applied on the applied film and dried, and the obtained applied film was rolled to produce a positive electrode in which the positive electrode mixture layer was formed on both surfaces of the aluminum foil and the additional layer was formed on the positive electrode mixture layer. In the production of the positive electrode, the basis weight of the positive electrode mixture layer per one surface was set to 270 g/m$^2$, and the basis weight of the additional layer was set to 10 g/m$^2$.

[Production of Negative Electrode]

Mixing 98 parts by mass of a negative electrode active material (graphite), 1 part by mass of SBR, and 1 part by mass of CMC was performed at this ratio, and an appropriate amount of water was further added thereto to prepare a negative electrode mixture slurry. Then, the negative electrode mixture slurry was applied on a copper foil having a thickness of 15 μm, and the applied film was dried. Thereafter, the applied film was rolled to produce a negative electrode in which a negative electrode mixture layer was formed on both surfaces of the negative electrode current collector.

[Preparation of Electrolyte Liquid]

Into a mixed solvent of ethylene carbonate (EC) and methyl ethyl carbonate (MEC) at a volume ratio of 3:7, lithium hexafluorophosphate ($LiPF_6$) was dissolved so that the concentration was 1 mol/litter to prepare an electrolyte liquid.

[Production of Test Cell]

The positive electrode and the negative electrode were stacked so that the electrodes were facing with each other with the separator disposed therebetween, and wound to produce an electrode assembly. The additional layer of the positive electrode was located between the positive electrode mixture layer and the separator (that is, the additional layer is located on the separator side). Then, the electrode assembly and the electrolyte liquid were housed in a bottomed cylindrical battery case body, the electrolyte liquid was injected, and then an opening of the battery case body was sealed with a gasket and a sealing assembly to produce a test cell.

The test cell was charged at a constant current of 0.2 C until a battery voltage reached 4.2 V under a temperature environment of 25° C., and then charged at a constant voltage until a current value reached 0.02 C. Thereafter, the test cell was discharged at a constant current of 0.05 C until the battery voltage reached 2.5 V.

The test cell after the charge and discharge was disassembled in a dry room to take a sample of the additional layer. The taken sample was measured with the powder X-ray diffraction measurement under the conditions described above to obtain an X-ray diffraction pattern. As a result, diffraction peaks indicating a crystal structure belonging to the space group Fm3m was observed. ICP analysis demonstrated that this sample had a composition of $LiFeO_2$. In other words, the charge and discharge of the test cell formed the additional layer including $LiFeO_2$ having the crystal structure belonging to the space group Fm3m. In addition, no $Li_5FeO_4$ component was detected in the sample taken from the additional layer, and thereby almost all $Li_5FeO_4$ in the additional layer is presumed to have been converted into the $LiFeO_2$ associated with the charge and discharge.

Example 2

A test cell was produced in the same manner as in Example 1 except that $Li_6MnO_4$ (average particle diameter: 1 μm) was used instead of $Li_5FeO_4$ (average particle diameter: 1 μm) in the preparation of the slurry for the additional layer of the positive electrode.

The test cell of Example 2 was charged and discharged in the same manner as in Example 1 to analyze the additional layer. As a result, the additional layer including $LiMnO_2$ having a crystal structure belonging to the space group Fm3m was formed. Almost all $Li_6MnO_4$ in the additional layer is presumed to have been converted into the $LiMnO_2$ associated with the charge and discharge.

Example 3

A test cell was produced in the same manner as in Example 1 except that $Li_2CuO_2$ (average particle diameter: 1 μm) was used instead of $Li_5FeO_4$ (average particle diameter: 1 μm) in the preparation of the slurry for the additional layer of the positive electrode.

The test cell of Example 3 was charged and discharged in the same manner as in Example 1 to analyze the additional layer. As a result, the additional layer including $LiCuO_2$ having a crystal structure belonging to the space group C2/m was formed. Almost all $Li_2CuO_2$ in the additional layer is presumed to have been converted into the $LiCuO_2$ associated with the charge and discharge.

Example 4

A test cell was produced in the same manner as in Example 1 except that $Li_2NiO_2$ (average particle diameter: 1 μm) was used instead of $Li_5FeO_4$ (average particle diameter: 1 μm) in the preparation of the slurry for the additional layer of the positive electrode.

The test cell of Example 4 was charged and discharged in the same manner as in Example 1 to analyze the additional layer. As a result, the additional layer including $LiNiO_2$ having a crystal structure belonging to the space group P3m1 was formed. Almost all $Li_2NiO_2$ in the additional layer is presumed to have been converted into the $LiNiO_2$ associated with the charge and discharge.

Example 5

A test cell was produced and charged and discharged in the same manner as in Example 1 except that the basis weight of the additional layer was set to 3.8 g/m² in the production of the positive electrode.

Example 6

A test cell was produced and charged and discharged in the same manner as in Example 1 except that the basis weight of the additional layer was set to 50 g/m² in the production of the positive electrode.

Example 7

A test cell was produced in the same manner as in Example 1 except that $Li_2NiO_2$ (average particle diameter: 1 μm) was used instead of $Li_5FeO_4$ (average particle diameter: 1 μm) in the preparation of the slurry for the additional layer of the positive electrode.

The test cell of Example 7 was charged and discharged in the same manner as in Example 1 to analyze the additional layer except that the battery voltage for charging was changed to 4.1 V. As a result, the additional layer including $Li_{1.4}NiO_2$ having a crystal structure belonging to the two space groups Immm and P3m1 was formed. Almost all $Li_2NiO_2$ in the additional layer is presumed to have been converted into the $Li_{1.4}NiO_2$ associated with the charge and discharge.

Example 8

A test cell was produced in the same manner as in Example 1 except that $Li_2Cu_{0.6}Ni_{0.4}O_2$ (average particle diameter: 1 μm) was used instead of $Li_5FeO_4$ (average particle diameter: 1 μm) in the preparation of the slurry for the additional layer of the positive electrode.

The test cell of Example 8 was charged and discharged in the same manner as in Example 1 to analyze the additional layer. As a result, the additional layer including $LiCu_{0.6}Ni_{0.4}O_2$ having a crystal structure belonging to the space group C2/m was formed. Almost all $Li_2Cu_{0.6}Ni_{0.4}O_2$ in the additional layer is presumed to have been converted into the $LiCu_{0.6}Ni_{0.4}O_2$ associated with the charge and discharge.

Example 9

A test cell was produced in the same manner as in Example 1 except that the slurry for the additional layer was applied on the aluminum foil and the slurry for the positive electrode mixture layer was applied on the applied film, in the production of the positive electrode. The additional layer of the positive electrode was located between the aluminum foil and the positive electrode mixture layer (in other words, the additional layer was located on the positive electrode current collector side). The test cell of Example 9 was charged and discharged in the same manner as in Example 1.

Example 10

A test cell was produced in the same manner as in Example 2 except that the slurry for the additional layer was applied on the aluminum foil and the slurry for the positive electrode mixture layer was applied on the applied film, in the production of the positive electrode. The additional layer of the positive electrode was located between the aluminum foil and the positive electrode mixture layer (in other words, the additional layer was located on the positive electrode current collector side). The test cell of Example 10 was charged and discharged in the same manner as in Example 2.

Example 11

A test cell was produced in the same manner as in Example 3 except that the slurry for the additional layer was applied on the aluminum foil and the slurry for the positive electrode mixture layer was applied on the applied film, in the production of the positive electrode. The test cell of Example 11 was charged and discharged in the same manner as in Example 3.

Example 12

A test cell was produced in the same manner as in Example 4 except that the slurry for the additional layer was applied on the aluminum foil and the slurry for the positive electrode mixture layer was applied on the applied film, in the production of the positive electrode. The test cell of Example 12 was charged and discharged in the same manner as in Example 4.

Example 13

A test cell was produced in the same manner as in Example 5 except that the slurry for the additional layer was applied on the aluminum foil and the slurry for the positive electrode mixture layer was applied on the applied film, in the production of the positive electrode. The test cell of Example 13 was charged and discharged in the same manner as in Example 5.

Example 14

A test cell was produced in the same manner as in Example 6 except that the slurry for the additional layer was applied on the aluminum foil and the slurry for the positive electrode mixture layer was applied on the applied film, in the production of the positive electrode. The test cell of Example 14 was charged and discharged in the same manner as in Example 6.

Example 15

A test cell was produced in the same manner as in Example 1 except that: $Li_5FeO_4$ (average particle diameter: 0.3 μm) was used instead of $Li_5FeO_4$ (average particle diameter: 1 μm); and the slurry for the additional layer was applied on the aluminum foil and the slurry for the positive electrode mixture layer was applied on the applied film, in the production of the positive electrode. The test cell of Example 15 was charged and discharged in the same manner as in Example 1.

Example 16

A test cell was produced in the same manner as in Example 1 except that: $Li_5FeO_4$ (average particle diameter: 1.5 μm) was used instead of $Li_5FeO_4$ (average particle diameter: 1 μm); and the slurry for the additional layer was applied on the aluminum foil and the slurry for the positive electrode mixture layer was applied on the applied film, in the production of the positive electrode. The test cell of Example 16 was charged and discharged in the same manner as in Example 1.

Comparative Example 1

A test cell was produced and charged and discharged in the same manner as in Example 1 except that $Al_2O_3$ (average particle diameter: 1 μm) was used instead of $Li_5FeO_4$ (average particle diameter: 1 μm) in the preparation of the slurry for the additional layer of the positive electrode.

Comparative Example 2

A test cell was produced in the same manner as in Example 1 except that $Al_2O_3$ (average particle diameter: 1 μm) was used instead of $Li_5FeO_4$ (average particle diameter: 1 μm) in the production of the positive electrode. The test cell was produced and charged and discharged in the same manner as in Example 1 except that the slurry for the additional layer was applied on the aluminum foil and the slurry for the positive electrode mixture layer was applied on the applied film.

Comparative Example 3

A test cell was produced in the same manner as in Example 9 except that: the basis weight of the additional layer was set to 2 g/m²; and the slurry for the additional layer was applied on the aluminum foil and the slurry for the positive electrode mixture layer was applied on the applied film, in the production of the positive electrode. The test cell of Comparative Example 3 was charged and discharged in the same manner as in Example 1.

Comparative Example 4

A test cell was produced and charged and discharged in the same manner as in Example 1 except that the basis weight of the additional layer was set to 2 g/m² in the production of the positive electrode.

[Nail Piercing Test]

Each of the test cells of Examples and Comparative Examples was tested with the following procedure. The evaluation results are shown in Table 1.

(1) The test cell was charged at a constant current of 0.2 C until a battery voltage reached 4.2 V under an environment of 25° C., and subsequently charged at a constant voltage until a current value reached 0.02 C.

(2) Under an environment of 25° C., a tip of a round nail having a diameter of 2.7 mm was brought into contact with a center of the side face of the test cell charged in (1), the test cell was pierced with the round nail in the radial direction of the battery at a rate of 1 mm/sec, and immediately after detecting a decrease in battery voltage due to the internal short circuit, the piercing with the round nail was stopped.

(3) A temperature on the side face of the bottomed cylindrical battery case body was measured to determine a maximum attained temperature.

TABLE 1

|  | Additional Layer | | Location of Additional Layer | Basis Weight of Additional Layer (g/m2) | Basis Weight of Positive Electrode Mixture Layer (g/m2) | Average Particle Diameter of Inert Material (μm) | Maximum Attained Battery Temperature in Nail Piercing Test (/° C.) |
|---|---|---|---|---|---|---|---|
|  | Before Charge | After Charge | | | | | |
| Example 1 | $Li_5FeO_4$ | $LiFeO_2$ | Separator Side | 10 | 270 | 1 | 490 |
| Example 2 | $Li_6MnO_4$ | $LiMnO_2$ | Separator Side | 10 | 270 | 1 | 490 |
| Example 3 | $Li_2CuO_2$ | $LiCuO_2$ | Separator Side | 10 | 270 | 1 | 490 |
| Example 4 | $Li_2NiO_2$ | $LiNiO_2$ | Separator Side | 10 | 270 | 1 | 500 |
| Example 5 | $Li_5FeO_4$ | $LiFeO_2$ | Separator Side | 3.8 | 270 | 1 | 490 |
| Example 6 | $Li_5FeO_4$ | $LiFeO_2$ | Separator Side | 50 | 270 | 1 | 490 |
| Example 7 | $Li_2NiO_2$ | $Li_{1.4}NiO_2$ | Separator Side | 10 | 270 | 1 | 500 |
| Example 8 | $Li_2Cu_{0.8}Ni_{0.4}O_2$ | $LiCu_{0.6}Ni_{0.4}O_2$ | Separator Side | 10 | 270 | 1 | 490 |
| Example 9 | $Li_5FeO_4$ | $LiFeO_2$ | Current Collector Side | 10 | 270 | 1 | 490 |
| Example 10 | $Li_6MnO_4$ | $LiMnO_2$ | Current Collector Side | 10 | 270 | 1 | 490 |
| Example 11 | $Li_2CuO_2$ | $LiCuO_2$ | Current Collector Side | 10 | 270 | 1 | 490 |
| Example 12 | $Li_2NiO_2$ | $LiNiO_2$ | Current Collector Side | 10 | 270 | 1 | 500 |
| Example 13 | $Li_5FeO_4$ | $LiFeO_2$ | Current Collector Side | 3.8 | 270 | 1 | 490 |
| Example 14 | $Li_5FeO_4$ | $LiFeO_2$ | Current Collector Side | 50 | 270 | 1 | 490 |
| Example 15 | $Li_5FeO_4$ | $LiFeO_2$ | Current Collector Side | 10 | 270 | 0.3 | 500 |
| Example 16 | $Li_5FeO_4$ | $LiFeO_2$ | Current Collector Side | 10 | 270 | 1.5 | 490 |
| Comparative Example 1 | $Al_2O_3$ | | Separator Side | 10 | 270 | 1 | 590 |
| Comparative Example 2 | $Al_2O_3$ | | Current Collector Side | 10 | 270 | 1 | 620 |
| Comparative Example 3 | $Li_5FeO_4$ | $LiFeO_2$ | Current Collector Side | 2 | 270 | 1 | 630 |
| Comparative Example 4 | $Li_5FeO_4$ | $LiFeO_2$ | Separator Side | 2 | 270 | 1 | 630 |

In Examples 1 to 16, each in which the positive electrode including the additional layer including the Li-containing transition metal oxide having the crystal structure belonging to any of the space groups Fm3m, Immm, and P3m1 (inert material) and having a basis weight of 3.8 g/m² or more and 50 g/m² or less was used, the maximum attained temperature of the battery in the nail piercing test was able to be lowered comparing with Comparative Examples 1 to 4, each in which the positive electrode: including no inert material; or including the inert material but including the additional layer having a basis weight of less than 3.8 g/m² was used. That is, it can be said that Examples 1 to 16 may have prevented the rise in battery temperature when an internal short circuit occurred due to piecing with a foreign matter.

Example 17

A test cell was produced in the same manner as in Example 9 except that: 94 parts by mass of $Li_5FeO_4$ (average particle diameter: 1 µm), 5 parts by mass of the positive electrode active material (composition: $LiNi_{0.88}Co_{0.09}Al_{0.03}O_2$), 0.5 parts by mass of acetylene black, and 0.5 parts by mass of polyvinylidene fluoride were mixed at this ratio to prepare a slurry for the additional layer; and the slurry for the additional layer was applied on the aluminum foil and the slurry for the positive electrode mixture layer was applied on the applied film. The test cell of Example 17 was charged and discharged in the same manner as in Example 1.

Example 18

A test cell was produced in the same manner as in Example 9 except that: 60 parts by mass of $Li_5FeO_4$ (average particle diameter: 1 µm), 29 parts by mass of the positive electrode active material (composition: $LiNi_{0.88}Co_{0.09}Al_{0.03}O_2$), 0.5 parts by mass of acetylene black, and 0.5 parts by mass of polyvinylidene fluoride were mixed at this ratio to prepare a slurry for the additional layer; and the slurry for the additional layer was applied on the aluminum foil and the slurry for the positive electrode mixture layer was applied on the applied film. The test cell of Example 18 was charged and discharged in the same manner as in Example 1.

Comparative Example 5

A test cell was produced in the same manner as in Example 9 except that: 40 parts by mass of $Li_5FeO_4$ (average particle diameter: 1 µm), 59 parts by mass of the positive electrode active material (composition: $LiNi_{0.88}Co_{0.09}Al_{0.03}O_2$), 0.5 parts by mass of acetylene black, and 0.5 parts by mass of polyvinylidene fluoride were mixed at this ratio to prepare a slurry for the additional layer; and the slurry for the additional layer was applied on the aluminum foil and the slurry for the positive electrode mixture layer was applied on the applied film. The test cell of Comparative Example 5 was charged and discharged in the same manner as in Example 1.

The test cells of Examples 17 and 18 and Comparative Example 5 after the charge and discharge were disassembled in a dry room to take samples of the additional layers. No $Li_5FeO_4$ component was detected in the samples taken from the additional layers, and almost all was $LiFeO_2$ component. That is, the content of $LiFeO_2$ in the additional layer was 94 mass % in Example 17, 60 mass % in Example 18, and 40 mass % in Comparative Example 5.

On the test cells of Examples 17 and 18 and Comparative Example 5, the nail piercing test was performed to measure a maximum attained temperature. As a result, the temperature was 500° C. in Example 17, 500° C. in Example 18, and 630° C. in Comparative Example 5. From these results, the content of the inert material in the additional layer needs to be 60 mass % or more to prevent the rise in battery temperature when an internal short circuit occurs due to piercing with a foreign matter.

REFERENCE SIGNS LIST

10 Lithium ion secondary battery
11 Positive electrode
12 Negative electrode
13 Separator
14 Electrode assembly
15 Battery case
16 Case body
17 Sealing assembly
18 Insulating plate
18, 19 Insulating plate
20 Positive electrode lead
21 Negative electrode lead
22 Projecting portion
23 Filter
24 Lower vent member
25 Insulating member
26 Upper vent member
27 Cap
28 Gasket
30 Positive electrode current collector
32 Positive electrode mixture layer
34 Additional layer

The invention claimed is:
1. A secondary battery, comprising:
a positive electrode;
a negative electrode;
a separator disposed between the positive electrode and the negative electrode; and
an electrolyte, wherein
the positive electrode has a positive electrode current collector, a positive electrode mixture layer including a positive electrode active material, and an additional layer including an inert material;
the inert material is a Li-containing transition metal oxide having a crystal structure belonging to any of space groups Fm3m, C2/M, Immm, and P3m1;
a content of the inert material in the additional layer is 60 mass % or more;
a basis weight of the additional layer is 3.8 g/m2 or more and 50 g/m2 or less;
the additional layer is located between the positive electrode current collector and the positive electrode mixture layer;
of the inert material, the Li-containing transition metal oxide having a crystal structure belonging to the space group Immm is a Li-containing transition metal oxide having a crystal structure with Cu as a main component of a transition metal; and
the inert material includes at least one of the group consisting of: a Li-containing transition metal oxide represented by $Li_xFe_yM_{1-y}O_2$, where $0.5 \leq x \leq 1.5$, $0.5 \leq y \leq 1$, and M represents a transition metal other than Fe, and belonging to a space group Fm3m; a Li-containing transition metal oxide represented by $Li_xMn_yM_{1-y}O_2$, where $0.5 \leq x \leq 1.5$, $0.5 \leq y \leq 1$, and M repre- sents a transition metal other than Mn, and belonging to a space group Fm3m; a Li-containing transition metal oxide represented by $Li_xCu_yM_{1-y}O_2$, where $0.5 \leq x \leq 1.5$, $0.5 \leq y \leq 1$, and M represents a transition metal other than Cu, and having a crystal structure belonging to any of space groups C2/M, Immm, and P3m1; and a Li-containing transition metal oxide represented by $Li_xNi_yM_{1-y}O_2$, where $0.5 \leq x \leq 1.5$, $0.5 \leq y \leq 1$, and M represents a transition metal other than Ni, and having a crystal structure belonging to any of space groups C2/M, and P3m1.

2. The secondary battery according to claim 1, wherein a void ratio of the additional layer is 25% or more and 55% or less.

3. The secondary battery according to claim 2, wherein a particle shape of the inert material is polyhedral, acicular, or necking.

4. The secondary battery according to claim 1, wherein the additional layer further includes a positive electrode active material.

* * * * *